United States Patent
Lin et al.

(10) Patent No.: US 11,395,962 B2
(45) Date of Patent: Jul. 26, 2022

(54) VIRTUAL REALITY CONTROLLER

(71) Applicant: HTC Corporation, Taoyuan (TW)

(72) Inventors: Jui-Hsiang Lin, Taoyuan (TW);
Chang-Hua Wei, Taoyuan (TW);
Shih-Hsiu Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 245 days.

(21) Appl. No.: 16/679,297

(22) Filed: Nov. 11, 2019

(65) Prior Publication Data
US 2020/0147485 A1 May 14, 2020

Related U.S. Application Data

(60) Provisional application No. 62/758,705, filed on Nov. 12, 2018.

(51) Int. Cl.
*A63F 13/245* (2014.01)
*A63F 13/218* (2014.01)
*A63F 13/211* (2014.01)

(52) U.S. Cl.
CPC .......... *A63F 13/245* (2014.09); *A63F 13/211* (2014.09); *A63F 13/218* (2014.09); *A63F 2300/8082* (2013.01)

(58) Field of Classification Search
CPC .... A63F 13/211; A63F 13/213; A63F 13/218; A63F 13/24; A63F 13/245; A63F 2300/8082

See application file for complete search history.

(56) References Cited

U.S. PATENT DOCUMENTS

| | | | |
|---|---|---|---|
| 6,262,712 B1* | 7/2001 | Osborne | G06F 3/011 345/161 |
| 9,870,052 B2* | 1/2018 | Higgins | A63F 13/218 |
| 9,898,091 B2* | 2/2018 | Bristol | G06F 3/0219 |
| 10,061,458 B1* | 8/2018 | Bristol | G06F 3/03547 |
| 10,065,111 B1* | 9/2018 | Patel | A63F 13/24 |
| 10,130,875 B2* | 11/2018 | Long | A63F 13/24 |
| 10,180,720 B2* | 1/2019 | Higgins | A63F 13/216 |
| 10,183,217 B2* | 1/2019 | Chen | A63F 13/245 |
| 10,258,873 B2* | 4/2019 | Wang | A63F 13/218 |
| 10,343,059 B2* | 7/2019 | Rogoza | A63F 13/24 |
| 10,391,400 B1* | 8/2019 | Mucha | A63F 13/214 |
| 10,537,795 B2* | 1/2020 | Bristol | A63F 13/30 |

(Continued)

FOREIGN PATENT DOCUMENTS

| | | |
|---|---|---|
| CN | 106237612 | 12/2016 |
| CN | 205880813 | 1/2017 |

*Primary Examiner* — William H McCulloch, Jr.
(74) *Attorney, Agent, or Firm* — JCIPRNET

(57) ABSTRACT

A virtual reality (VR) controller includes a handle, a side housing, and a switch. The side housing has a fixed portion and a flexible portion. The fixed portion is fixed to the handle, and a contour of the side housing extending toward the handle conforms to a shape of a palm. The switch is disposed between the handle and the side housing. The flexible portion is deformed to trigger the switch when the handle and the side housing are held and a force is applied to the flexible portion relative to the handle. In other words, the flexible portion abutting against the palm is deformed to trigger the switch when the handle and the side housing are held and a force is applied, relative to the flexible portion, to one side of the handle far away from the flexible portion.

11 Claims, 7 Drawing Sheets

(56) References Cited

U.S. PATENT DOCUMENTS

| | | | |
|---|---|---|---|
| 10,579,151 B2* | 3/2020 | Liu | A63F 13/218 |
| 10,675,546 B2* | 6/2020 | Muramatsu | A63F 13/98 |
| 10,691,233 B2* | 6/2020 | Dalton | G06F 3/03547 |
| 10,712,835 B2* | 7/2020 | Lee | G06F 3/0304 |
| 10,740,924 B2* | 8/2020 | Balan | A63F 13/211 |
| 10,775,946 B2* | 9/2020 | Erivantcev | G06F 3/017 |
| 10,824,244 B2* | 11/2020 | Kin | A63F 13/214 |
| 10,874,936 B2* | 12/2020 | Higgins | A63F 13/218 |
| 10,894,208 B2* | 1/2021 | Bristol | A63F 13/23 |
| 10,898,797 B2* | 1/2021 | Petersen | A63F 13/24 |
| 10,901,506 B2* | 1/2021 | Wu | G06F 3/017 |
| 10,912,990 B2* | 2/2021 | Higgins | A63F 13/213 |
| 10,987,573 B2* | 4/2021 | Nietfeld | G06F 3/0346 |
| 10,996,743 B2* | 5/2021 | Chang | G06F 3/0346 |
| 10,996,765 B2* | 5/2021 | Liu | A63F 13/245 |
| 11,054,895 B2* | 7/2021 | Ho | A63F 13/5252 |
| 11,068,058 B2* | 7/2021 | Pan | B06B 1/0269 |
| 11,068,078 B2* | 7/2021 | Lee | G06F 3/0346 |
| 2001/0045938 A1* | 11/2001 | Willner | A63F 13/06 348/E5.103 |
| 2010/0295787 A1* | 11/2010 | Tang | G06F 3/03543 345/166 |
| 2010/0298053 A1* | 11/2010 | Kotkin | A63F 13/24 463/37 |
| 2016/0357261 A1* | 12/2016 | Bristol | G06F 1/1686 |
| 2016/0363996 A1* | 12/2016 | Higgins | A63F 13/218 |
| 2017/0136351 A1* | 5/2017 | Long | A63F 13/24 |
| 2017/0189798 A1* | 7/2017 | Rogoza | A63F 13/24 |
| 2017/0189802 A1* | 7/2017 | Rogoza | A63F 13/24 |
| 2017/0192536 A1* | 7/2017 | Wang | G06F 3/03543 |
| 2017/0308165 A1* | 10/2017 | Erivantcev | A63F 13/235 |
| 2018/0099219 A1* | 4/2018 | Hope | A63F 13/24 |
| 2018/0229114 A1* | 8/2018 | Wang | A63F 13/24 |
| 2018/0264357 A1* | 9/2018 | Dalton | G06F 3/014 |
| 2018/0296913 A1* | 10/2018 | Chen | G06F 3/014 |
| 2018/0311575 A1* | 11/2018 | Bristol | A63F 13/24 |
| 2019/0138107 A1* | 5/2019 | Nietfeld | G06F 3/038 |
| 2019/0201783 A1* | 7/2019 | Higgins | A63F 13/24 |
| 2019/0318501 A1* | 10/2019 | Balan | A63F 13/212 |
| 2019/0344173 A1* | 11/2019 | Mucha | A63F 13/24 |
| 2019/0384419 A1* | 12/2019 | Li | A63F 13/24 |
| 2020/0061457 A1* | 2/2020 | Bristol | A63F 13/24 |
| 2020/0147485 A1* | 5/2020 | Lin | A63F 13/218 |
| 2020/0159337 A1* | 5/2020 | Kin | G06F 3/011 |
| 2020/0201460 A1* | 6/2020 | Erivantcev | G06F 3/017 |
| 2020/0218377 A1* | 7/2020 | Dalton | G06F 3/011 |
| 2020/0246691 A1* | 8/2020 | Petersen | A63F 13/24 |
| 2021/0129013 A1* | 5/2021 | Higgins | A63F 13/214 |
| 2021/0228978 A1* | 7/2021 | Nietfeld | G06F 3/0346 |

* cited by examiner

VIRTUAL REALITY CONTROLLER

CROSS-REFERENCE TO RELATED APPLICATION

This application claims the priority benefit of U.S. provisional application Ser. No. 62/758,705, filed on Nov. 12, 2018. The entirety of the above-mentioned patent application is hereby incorporated by reference herein and made a part of specification.

BACKGROUND

Technical Field

The disclosure relates to a virtual reality (VR) device, and in particular, to a VR controller adapted to be held by a right or left hand to interact with a virtual environment to perform actions such as capturing, picking up, or triggering.

Description of Related Art

Virtual reality (VR) technology is becoming popular, and a handheld controller is a common VR input device. A user may control an action by pressing a button of the handheld controller. However, in terms of user experience, it is not intuitive to perform an action such as capturing or picking up through finger tap in VR.

SUMMARY

The disclosure provides a virtual reality (VR) controller configured to provide a more intuitive trigger action to deliver instructions such as capturing or picking up in VR.

According to an embodiment of the disclosure, a VR controller is adapted to sense a motion in a three-dimensional space. The VR controller includes a handle, a side housing, and a switch. The side housing has a fixed portion and a flexible portion. The fixed portion is fixed to the handle, and a contour of the side housing extending toward the handle conforms to a shape of a palm. The switch is disposed between the handle and the side housing. The flexible portion is deformed to trigger the switch when the handle and the side housing are held and a force is applied to the flexible portion relative to the handle. In other words, the flexible portion abutting against the palm is deformed to trigger the switch when the handle and the side housing are held and a force is applied, relative to the flexible portion, to one side of the handle far away from the flexible portion.

In an embodiment of the disclosure, a contour of the handle extending toward the side housing conforms to the shape of the palm.

In an embodiment of the disclosure, the side housing has a bump connected to the flexible portion to trigger the switch.

In an embodiment of the disclosure, the side housing has an outer frame connected to the fixed portion and surrounding the flexible portion together with the fixed portion.

In an embodiment of the disclosure, the VR controller further includes at least one fastener fastening the fixed portion to the handle.

In an embodiment of the disclosure, the VR controller further includes a shielding member fixed to the side housing to shield the at least one fastener.

In an embodiment of the disclosure, the VR controller further includes a position sensing portion disposed on the handle to sense a position of the hand.

In an embodiment of the disclosure, the VR controller further includes an index finger control portion disposed on the handle and not between the handle and the side housing to be touched or pressed by a finger.

In an embodiment of the disclosure, the VR controller further includes an actuator disposed in the handle. The actuator generates a feedback movement when the switch is pressed by the side housing.

In an embodiment of the disclosure, the VR controller further includes an orientation sensor disposed in the handle to sense an orientation and a movement of the handle.

According to another embodiment of the disclosure, a VR controller is adapted to sense a motion in a three-dimensional space. The VR controller includes a handle, a side housing, and a pressure sensor. The side housing is fixed to the handle. A contour of the side housing extending toward the handle conforms to a shape of a palm. The pressure sensor is disposed in the side housing. The pressure sensor senses an amount of deformation of the side housing when the handle and the side housing are held and a force is applied to the side housing relative to the handle.

In an embodiment of the disclosure, when the amount of deformation of the side housing exceeds a preset value, the current deformation of the side housing is defined as a trigger action.

In an embodiment of the disclosure, the VR controller further includes a position sensing portion disposed on the handle to sense an orientation of the handle.

In an embodiment of the disclosure, the VR controller further includes an index finger control portion disposed on the handle and not between the handle and the side housing to be touched or pressed by a finger.

In an embodiment of the disclosure, the VR controller further includes an actuator disposed in the handle. The actuator generates a feedback movement when the switch is pressed by the side housing.

In an embodiment of the disclosure, the VR controller further includes an orientation sensor disposed in the handle to sense an orientation and a movement of the handle.

Based on the above, according to the foregoing embodiments of the disclosure, the VR controller provides a more intuitive trigger action using the side cover and the switch (or the pressure sensor), to deliver instructions such as capturing or picking up in VR.

DESCRIPTION OF THE EMBODIMENTS

Figure 1:
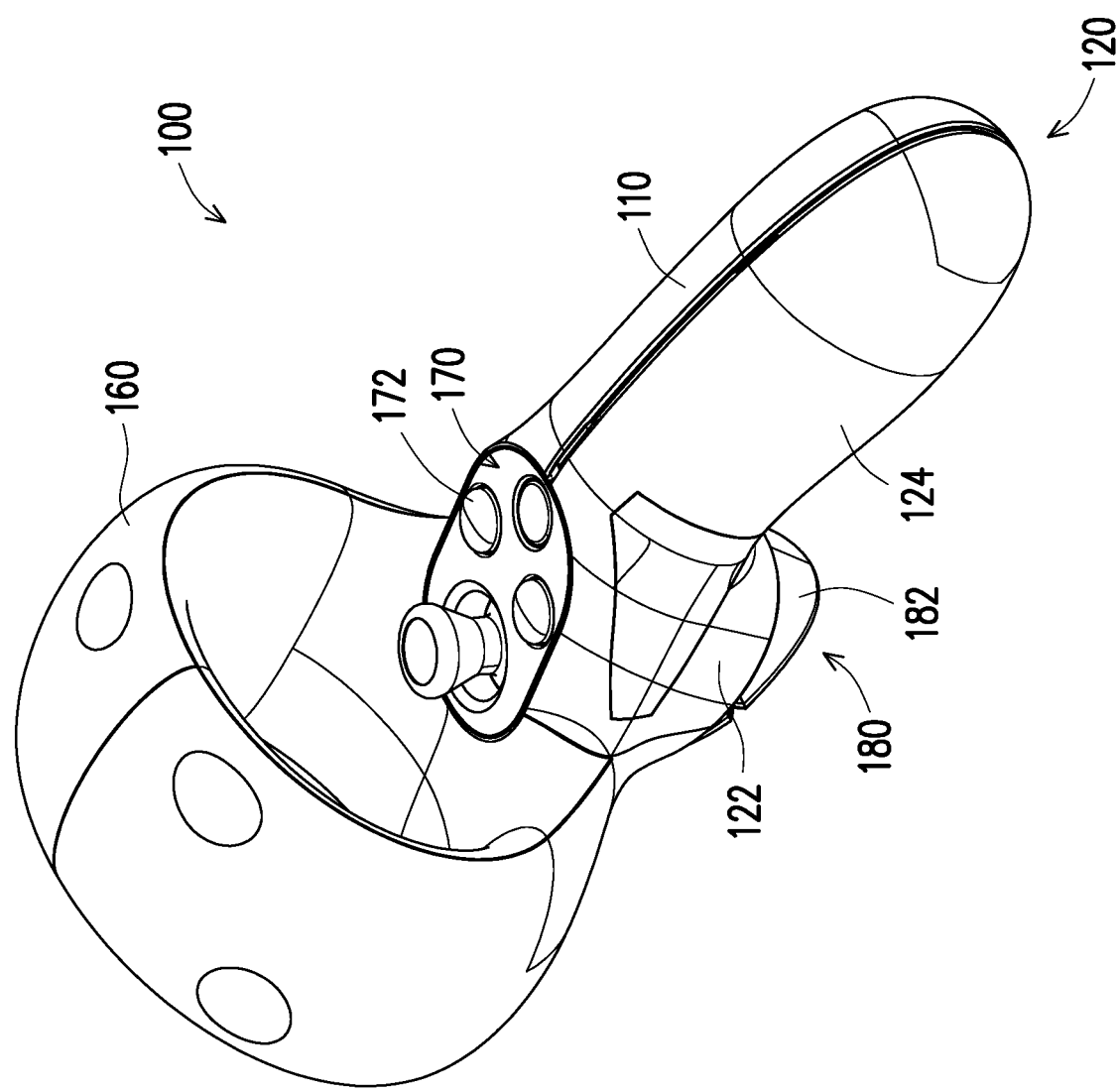
FIG. 1 is a schematic diagram of a virtual reality (VR) controller according to an embodiment of the disclosure.

Referring to FIG. 1, in the present embodiment, a virtual reality (VR) controller 100 is configured to sense a motion in a three-dimensional space and may perform wireless communication with other VR devices (for example, a head-mounted display, a host, a server, and a computer system for VR) through a wireless module (not shown). A user may perform actions such as capturing and picking up in the VR using the VR controller 100.

Figure 2:
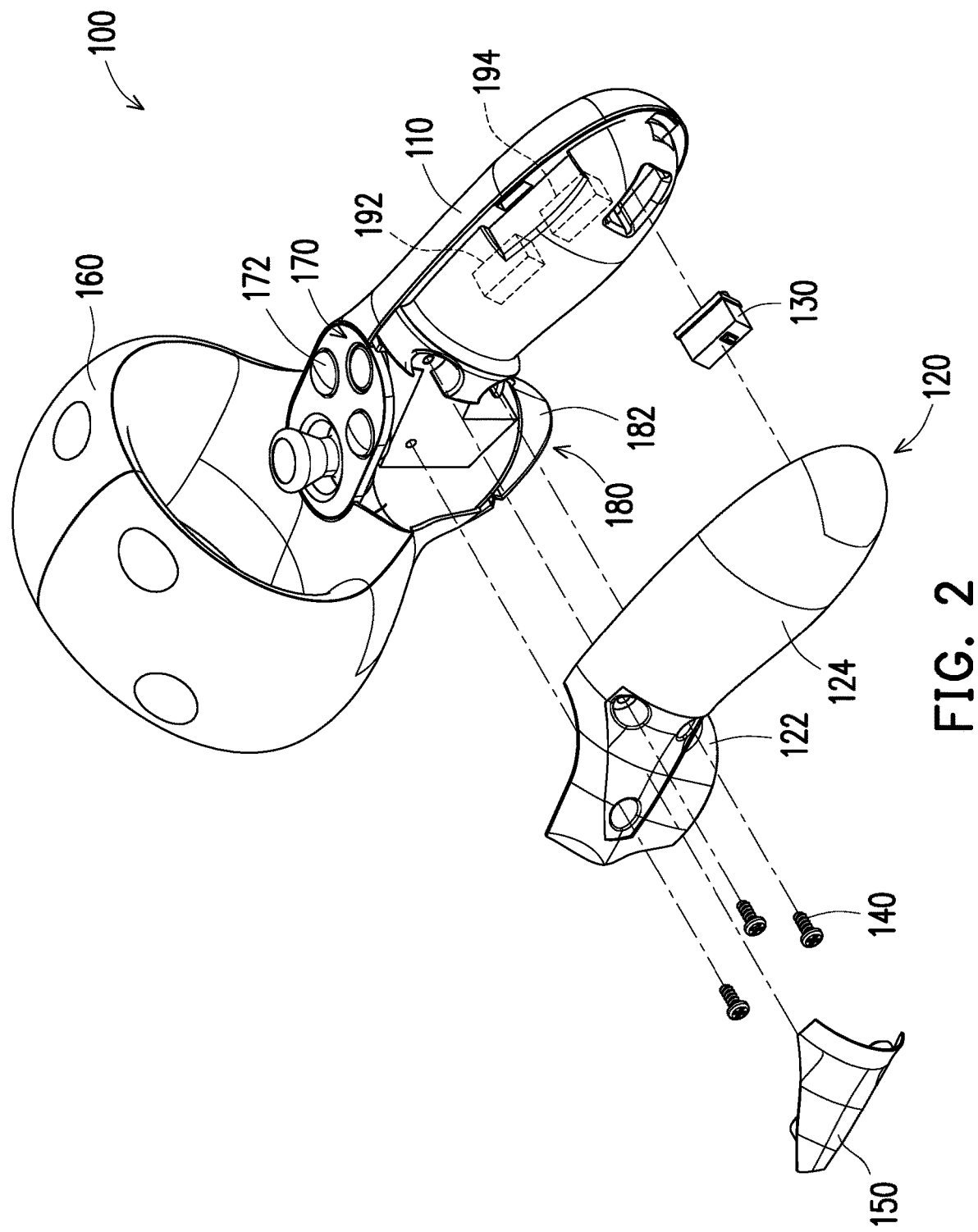
FIG. 2 is an exploded view of the VR controller in FIG. 1.
Figure 3:
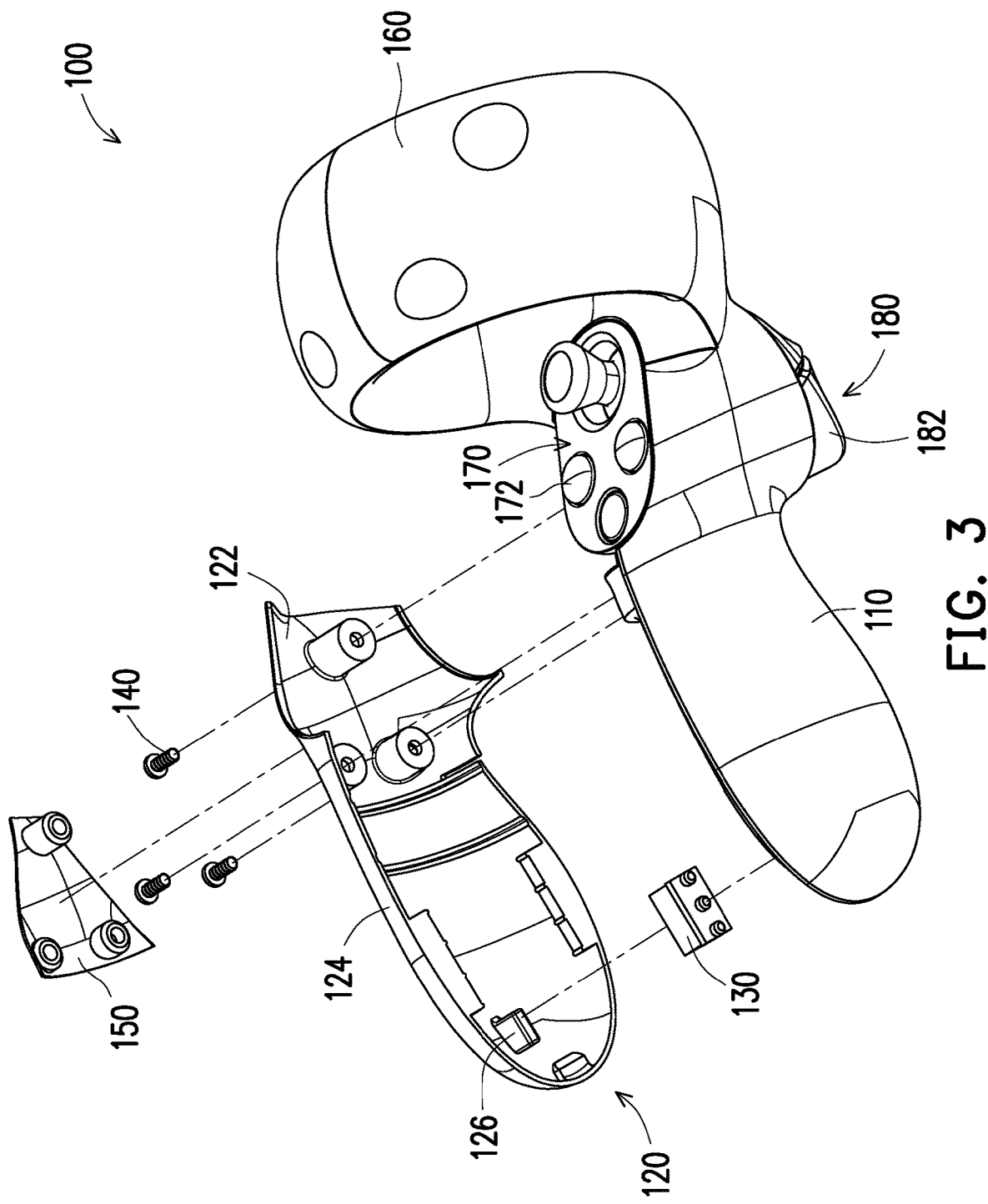
FIG. 3 is an exploded view of the VR controller in FIG. 1 from another angle.

Referring to FIG. 1 to FIG. 3, the VR controller 100 includes a handle 110, a side housing 120, and a switch 130. The side housing 120 has a fixed portion 122 and a flexible portion 124, and the fixed portion 122 is fixed to the handle 110. Contours of the side housing 120 and the handle 110 conform to a shape of a palm. In particular, a contour of the side housing 120 extending toward the handle 110 conforms to the shape of the palm, and a contour of the handle 110 extending toward the side housing 120 may also conform to the shape of the palm. The switch 130 is disposed between the handle 110 and the side housing 120. The flexible portion 124 is deformed to trigger the switch 130 when the handle 110 and the side housing 120 are held and a force is applied to the flexible portion 124 relative to the handle 110. In other words, the flexible portion 124 abutting against the palm is deformed to trigger the switch 130 when the handle 110 and the side housing 120 are held and a force is applied to, relative to the flexible portion 124, one side of the handle 110 far away from the flexible portion 124.

Referring to FIG. 3, in the present embodiment, the side housing 120 has a bump 126 connected to the flexible portion 124 to trigger the switch 130. The switch 130 in the present embodiment is, for example, a spring switch. However, in other embodiments, the switch may be a pressure sensor, a force sensor, a light sensor, a thermal sensor, a microwave sensor, an ultrasonic sensor, an electric sensor, a current sensor, a capacitance sensor, a resistance sensor, a voltage sensor, an electrocardiogram (ECG) sensor, an electronic gastroscope (EGG) sensor, or the like.

Referring to FIG. 1 to FIG. 3, the VR controller 100 further includes at least one fastener 140 (a plurality of bolts is used in the present embodiment) fastening the fixed portion 122 of the side cover to the handle 110. In addition, the VR controller 100 further includes a shielding plate 150 fixed to the side housing 120 to shield the fastener 140.

Referring to FIG. 1, the VR controller 100 may further include a position sensing portion 160 disposed on the handle 110 to sense a position of the handle 110. In the present embodiment, the position sensing portion 160 is located at one end of the handle 110 and has a plurality of photosensors, so that an external apparatus senses the position of the handle 110.

Referring to FIG. 1, the VR controller 100 may further include a thumb control portion 170 disposed on the handle 110 to be touched or pressed by a finger. In the present embodiment, the thumb control portion 170 includes at least one thumb key 172 that may be touched or pressed by a thumb to trigger a corresponding instruction.

Referring to FIG. 1, the VR controller 100 may further include an index finger control portion 180 disposed on the handle 110 to be touched or pressed by a finger. In the present embodiment, the index finger control portion 180 includes at least one index finger key 182 that may be touched or pressed by an index finger to trigger a corresponding instruction.

Referring to FIG. 1 to FIG. 3, the VR controller 100 may further include an actuator 192 disposed in the handle 110 to generate feedback from a user. In the present embodiment, the actuator 192 is, for example, a vibrator, an electrode actuator, a heater, a fan, or a blower. Therefore, the actuator 192 may be driven to generate an action fed back to the user, such as vibrating, generating a current, heating, or generating an air flow. In addition, the actuator 192 may be electrically coupled to the switch 130.

Referring to FIG. 2, the VR controller 100 may further include an orientation sensor 194 disposed in the handle 110 to sense an orientation and a movement of the handle 110. The orientation sensor 194 may include components such as an accelerometer, a gyroscope, and a magnetometer.

Figure 4:
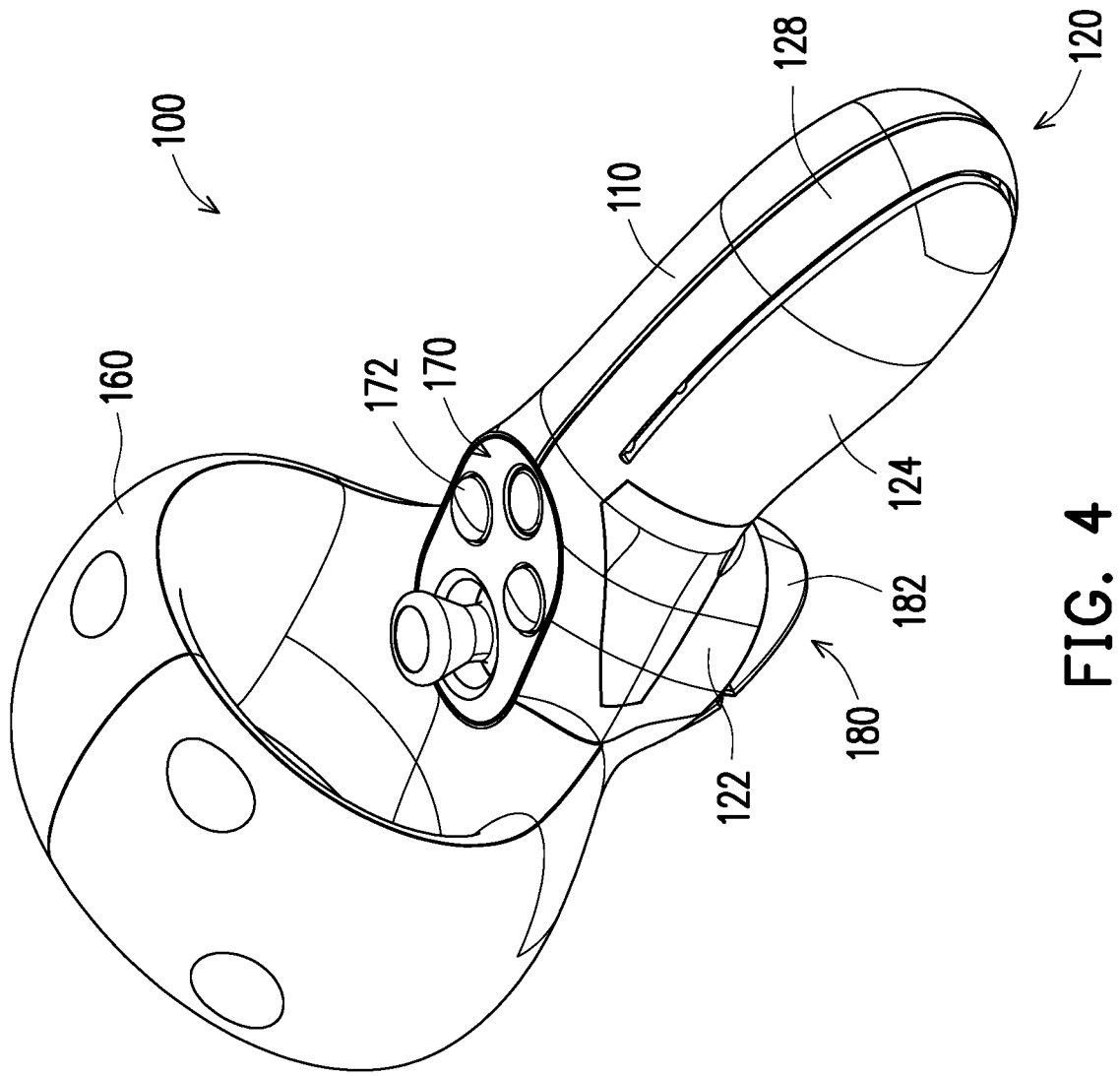
FIG. 4 is a schematic diagram of a VR controller according to another embodiment of the disclosure.
Figure 5:
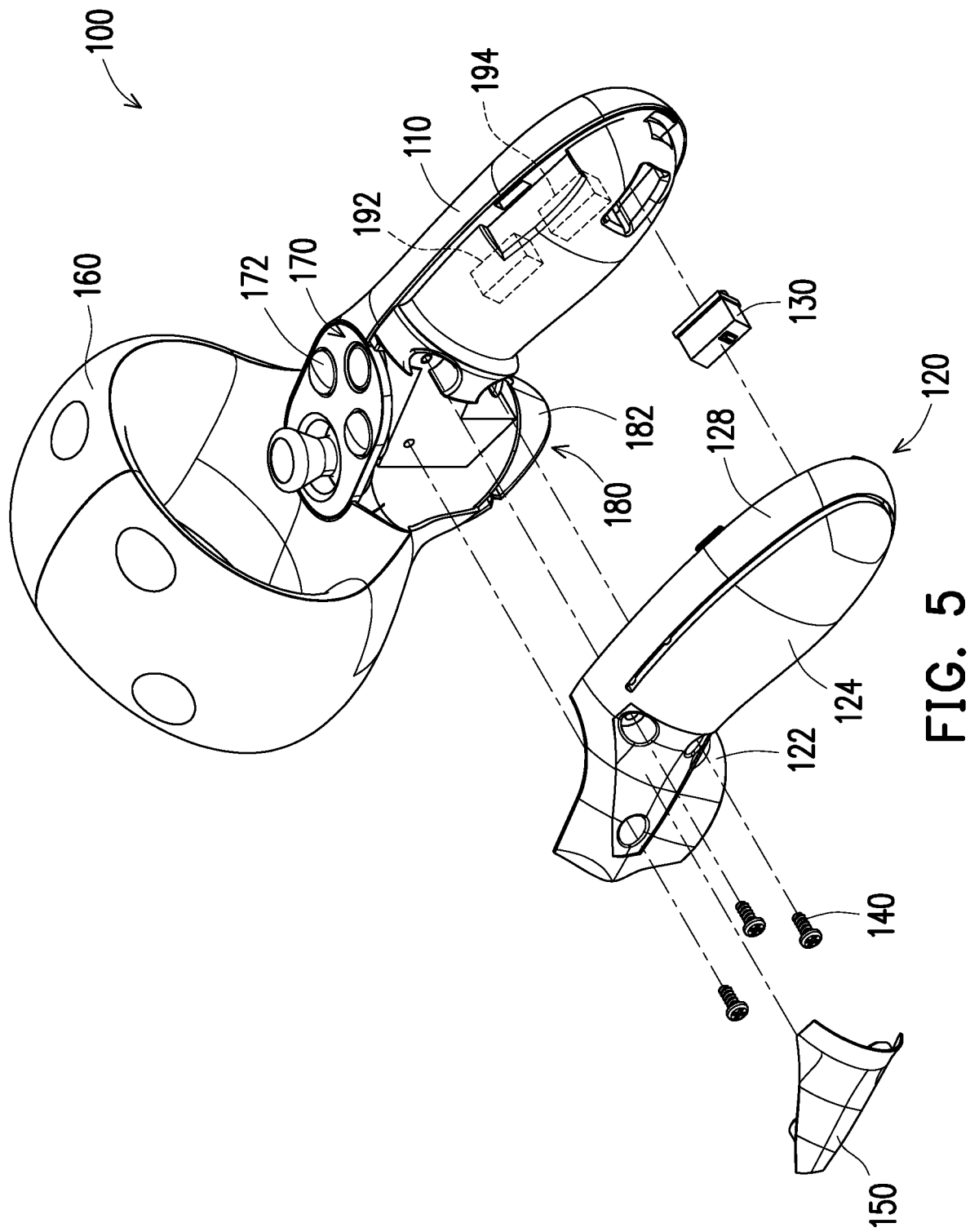
FIG. 5 is an exploded view of the VR controller in FIG. 1.
Figure 6:
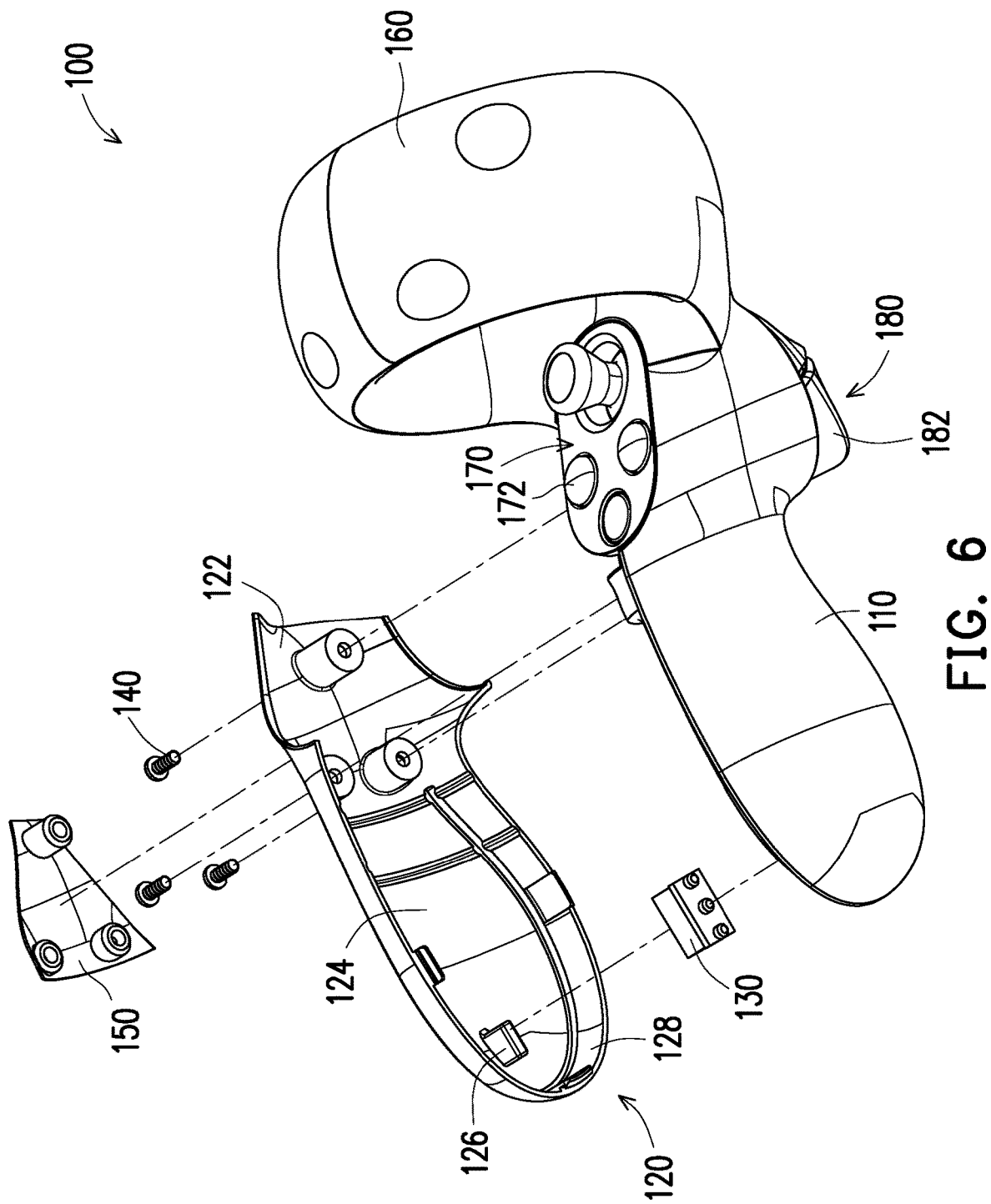
FIG. 6 is an exploded view of the VR controller in FIG. 1 from another angle.

Referring to FIG. 4 to FIG. 6, an embodiment shown in FIG. 4 to FIG. 6 has the same structural configuration as the embodiment shown in FIG. 1 to FIG. 3, and a difference between the two is that the side cover in the embodiment shown in FIG. 4 to FIG. 6 has an outer frame 128 connected to the fixed portion 122 and surrounding the flexible portion 124 together with the fixed portion 122. Accordingly, the flexible portion 124 may move relative to the fixed portion 122 and the outer frame 128 to trigger the switch 130 disposed on the handle 110.

Figure 7:
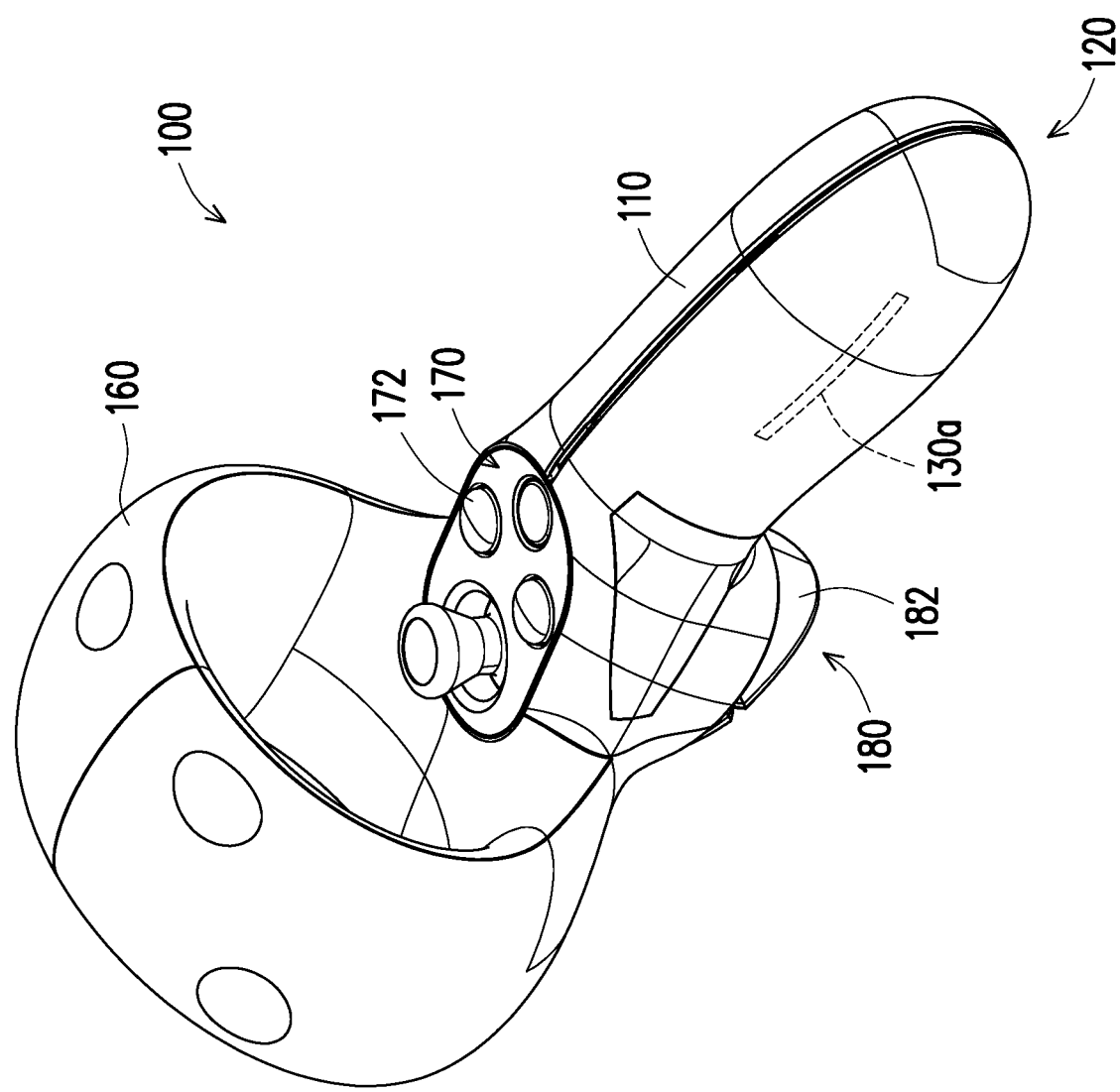
FIG. 7 is a schematic diagram of a VR controller according to still another embodiment of the disclosure.

Referring to FIG. 7, in comparison with the embodiments in FIG. 1 and FIG. 4, the side cover of the VR controller 100 in the embodiment in FIG. 7 is directly fixed to the handle 110. The VR controller 100 in the embodiment in FIG. 7 has a pressure sensor 130a disposed on the side housing 120. The pressure sensor 130a senses an amount of deformation of the side housing 120 when the handle 110 and the side housing 120 are held and a force is applied to the side housing 120 relative to the handle 110, to obtain a force applied by a user to the handle 110 and the side cover 120 using a hand. In the present embodiment, when the amount of deformation of the side housing 120 exceeds a preset value, the current deformation of the side housing 120 may be defined as a trigger action, which is similar to a case in which the switch 130 in the embodiments in FIG. 1 and FIG. 4 is triggered.

In summary, according to the foregoing embodiments of the disclosure, the VR controller provides a more intuitive trigger action using the side cover and the switch (or the pressure sensor), to deliver instructions such as capturing or picking up in VR.

What is claimed is:

1. A virtual reality (VR) controller adapted to sense a motion in a three-dimensional space, the VR controller comprising:
   a handle;
   a side housing having a fixed portion and a flexible portion, wherein the fixed portion is fixed to the handle, and a contour of the side housing extending toward the handle conforms to a shape of a palm; and
   a switch disposed between the handle and the side housing, wherein the flexible portion abutting against the palm is deformed to move proximal to the switch so as to trigger the switch when the handle and the side housing are held and a force is applied, relative to the flexible portion, to one side of the handle proximal to the switch.

2. The VR controller according to claim 1, wherein a contour of the handle extending toward the side housing conforms to the shape of the palm.

3. The VR controller according to claim 1, wherein the side housing has a bump connected to the flexible portion to trigger the switch.

4. The VR controller according to claim 1, wherein the side housing has an outer frame connected to the fixed portion and surrounding the flexible portion together with the fixed portion.

5. The VR controller according to claim 1, further comprising:

at least one fastener fastening the fixed portion to the handle.

6. The VR controller according to claim 5, further comprising:
a shielding member fixed to the side housing to shield the at least one fastener.

7. The VR controller according to claim 1, further comprising:
a position sensing portion disposed on the handle to sense a position of the handle.

8. The VR controller according to claim 1, further comprising:
an index finger control portion disposed on the handle to be touched or pressed by a finger.

9. The VR controller according to claim 1, further comprising:
an actuator disposed in the handle, wherein the actuator generates a feedback movement when the switch is pressed by the side housing.

10. The VR controller according to claim 1, further comprising:
an orientation sensor disposed in the handle to sense an orientation and a movement of the handle.

11. The VR controller according to claim 1, wherein the flexible portion abutting against a plurality of fingers of a same hand is deformed to move proximal to the switch so as to trigger the switch when the handle and the side housing are held and a force is applied, relative to the handle, to the flexible portion proximal to the switch.

* * * * *